(12) United States Patent
Alexander et al.

(10) Patent No.: US 6,467,006 B1
(45) Date of Patent: Oct. 15, 2002

(54) TOPOLOGY-INDEPENDENT PRIORITY ARBITRATION FOR STACKABLE FRAME SWITCHES

(75) Inventors: Thomas Alexander, Mulino, OR (US); Matt Smith, Beaverton, OR (US)

(73) Assignee: PMC-Sierra, Inc., Brunaby (CA)

( * ) Notice: Subject to any disclaimer, the term of this patent is extended or adjusted under 35 U.S.C. 154(b) by 0 days.

(21) Appl. No.: 09/350,738

(22) Filed: Jul. 9, 1999

(51) Int. Cl.$^7$ ............................ G06F 13/14; G06F 13/42
(52) U.S. Cl. ............................ 710/240; 710/105
(58) Field of Search ............... 710/240–244, 710/105–106

(56) References Cited

U.S. PATENT DOCUMENTS

| | | | |
|---|---|---|---|
| 4,467,418 A | * | 8/1984 | Quinquis ................ 710/119 |
| 4,470,110 A | * | 9/1984 | Chiarottino et al. ....... 709/225 |
| 4,626,843 A | * | 12/1986 | Szeto et al. ............. 340/825.5 |
| 4,633,394 A | * | 12/1986 | Georgiou et al. .......... 710/240 |
| 4,654,655 A | * | 3/1987 | Kowalski ................ 340/825.5 |
| 4,667,192 A | * | 5/1987 | Schmid et al. ............ 340/825.5 |
| 4,719,458 A | * | 1/1988 | Miesterfeld et al. ...... 340/825.5 |
| 5,101,482 A | * | 3/1992 | Kipnis ................... 710/118 |
| 5,263,163 A | * | 11/1993 | Holt et al. .............. 710/242 |
| 5,398,243 A | * | 3/1995 | Aguilhon et al. .......... 370/438 |
| 5,555,420 A | * | 9/1996 | Sarangdhar et al. ....... 710/266 |
| 5,557,754 A | * | 9/1996 | Sone et al. .............. 710/107 |
| 5,689,657 A | * | 11/1997 | Desor et al. ............. 710/119 |
| 5,740,174 A | * | 4/1998 | Somer ................... 370/402 |
| 5,754,803 A | * | 5/1998 | Regis ................... 710/119 |
| 5,781,745 A | * | 7/1998 | Ramelson et al. ......... 710/113 |
| 5,968,154 A | * | 10/1999 | Cho ..................... 710/119 |
| 6,058,449 A | * | 5/2000 | Linzmeier et al. ......... 710/107 |

OTHER PUBLICATIONS

"Futurebus+ Logical Protocol Specification", ISO/IEC 10857:1994 (IEEE 896.1).
The Phillips Semiconductor "I2C–Bus Specification", Version 2.0, Dec. 1998.

* cited by examiner

*Primary Examiner*—Sumati Lefkowitz
(74) *Attorney, Agent, or Firm*—Oyen Wiggs Green & Mutala

(57) ABSTRACT

Each one of a plurality of processors has a data storage register and a unique identifier. A message passing network interconnects the registers and processors. Each processor can store data in each register, but can read data only from its own register. "Master" priority is arbitratively allocated to one of the processors by repetitively, for each processor which has not previously been dismissed as a master candidate and until all but one processor is dismissed as a master candidate: storing a dismissal value in the processor's register; selecting the next portion of the processor's identifier; if the selected portion corresponds to a non-dismissal value, storing the non-dismissal value in all of the registers; if the selected portion corresponds to the dismissal value and if the non-dismissal value is stored in the processor's register, dismissing the processor as a master candidate.

27 Claims, 6 Drawing Sheets

TOPOLOGY-INDEPENDENT PRIORITY ARBITRATION FOR STACKABLE FRAME SWITCHES

TECHNICAL FIELD

This invention provides a priority arbitration mechanism for selecting a "master" frame switch from a plurality of stacked frame switches. The mechanism is independent of the topology used to interconnect the switches.

BACKGROUND

"Stackable" Ethernet switches are emerging as a possible alternative to chassis-based modular Ethernet switches, offering some of the same expandability and unified management capabilities as chassis-based systems without the concomitant start-up cost and configuration problems. These switches usually consist of one or more identical boxes, "stacked" one on top of another, and interconnected by means of cables carrying Ethernet packet data as well as control information. Switches interconnected in this fashion perform as a single entity (with respect to management protocols) rather than as a collection of isolated units. This simplifies the network manager's task by facilitating presentation of a unified view of a large network.

Each of the individual units constituting a stack of switches normally contains a stack controller central processing unit (CPU) that serves to configure and manage the system. Because the individual units are identical, a stacked system contains multiple stack controller CPUs. It is necessary to prevent conflicts and contention among the multiple CPUs by allowing only one CPU to function as a controller (for the entire stack) at a time, and by preventing the other CPUs from interfering with the management operations. Support for stackable switches thus typically involves implementing some means whereby only one of several CPUs in the stack is permitted to operate at a time.

It is possible to manually select a particular stack controller CPU to act as the overall stack controller, or "master". However, this can create problems stemming from user error or CPU failure. It is preferable to implement some form of autonomous process whereby each of the multiple stack controller CPUs contend with one another in an "election" or priority arbitration scheme for control of the stack, with a single "winner" being permitted to assume stack mastership and perform the required configuration and management operations. This has the further advantage of allowing an automatic switchover of mastership from one CPU to another in the event of a CPU failure. Thus, if a previously determined "winner" fails during operation, then a new "winner" can be automatically "elected", without human intervention, to take over the management of the stack.

Current implementations of stackable switches use some form of auxiliary hardware, requiring special connections or support logic, to resolve contention between multiple stack controller CPUs in a single system. This has the disadvantage of increased cost, as well as rendering the election process dependent on the specific system topology (i.e., the pattern of interconnections between units in a stack). In addition, these approaches are difficult to scale, and hence restrict the number of units that may be placed in a single stack. Examples of such prior art implementations include "Futurebus+Logical Protocol Specification", ISO/IEC 10857:1994 (IEEE 896.1, 1994); and, The Philips Semiconductors "I2C-Bus Specification", Version 2.0, December, 1998.

A preferable priority arbitration process for implementing the stack controller CPU election process should satisfy the following objectives:

1. The process must be completely automatic, requiring no manual intervention or configuration.
2. The process must function properly with unknown stack interconnect topologies, because the topology may be unknown at the time that a stack controller CPU is required to begin performing its duties.
3. The process must support automatic switchover from any "winner" stack controller CPU to a backup CPU if the "winner" CPU fails for any reason during switch operation.
4. The process must be capable of dealing with the addition or removal of new stack controllers at random times without failure. This may occur, for example, as individual units within the same stack are powered on at slightly varying intervals, or when a new unit is added to a stack and interconnected to the existing units.
5. The process must be robust in the face of errors, and must not rely on any precise timing relationships between signals in different units in the stack. In particular, the process should not rely on any centralized mechanism, but should use a completely distributed approach to avoid creating a single point of failure that could potentially prevent a backup CPU from taking over from a failed CPU.
6. The process algorithm should be simple and reliable, and the implementation should not be expensive in terms of hardware or bandwidth resources.
7. The process algorithm should be capable of being implemented without consuming a large amount of interconnect bandwidth (in the form of additional physical interconnects, or data transfer capacity within existing interconnects) during the arbitration process.

The present invention satisfies the foregoing objectives.

SUMMARY OF THE INVENTION

The invention provides a topology-independent priority arbitration mechanism for realizing the stack controller arbitration process, and is preferably implemented as a combination of hardware and software. The hardware performs basic, primitive operations respecting the transfer of individual bits of information between stack controller CPUs. The software utilizes the hardware to perform the actual priority arbitration process and "elect" a single CPU to be the "master" of the stacked system.

The priority arbitration mechanism is implemented in a distributed manner, with each stack controller CPU running an dentical copy of the software and possessing an identical set of hardware resources. This eliminates the possibility of a single point of failure that would prevent a backup CPU from taking over "mastership" of the stack in the event of a catastrophic failure of the current stack master. To deal with the situation where the currently elected stack controller CPU is removed from the stack (either by system failure, or by the removal of the unit containing the CPU), the priority arbitration procedure is continuously repeated while the stack is powered on. A resolution mechanism is provided to determine when a backup stack controller CPU should be allowed to assume mastership if the current stack master is no longer present, or is not functioning. In addition, this simplifies the process of dealing with the insertion or removal of units containing stack controller CPUs at arbitrary times; the removal of a unit may be treated equivalently to the failure of a controller, and no special considerations are required to handle this event.

The general architectural model within which the priority arbitration mechanism is expected to operate is that of a set of stack controller CPUs (typically, one CPU is located within one unit within the stack) interconnected by means of a switching fabric. The fabric is required to switch data from one physical port to another, to fulfill the functions of a network switching system. The priority arbitration mechanism consumes a very small portion of the transfer bandwidth of the switching fabric in order to transfer control information between CPUs and implement the controller arbitration algorithm.

DESCRIPTION

In the EXACT™ Ethernet system, the switching fabric is realized using dedicated silicon devices interconnected in a variety of ways. In addition, the interfaces between the physical Ethernet ports and the switching fabric are contained within other hardware devices called "port controllers". The port controllers implement special hardware functions that permit the stack controller CPUs to exchange information over the switching fabric.

Figure 1A:
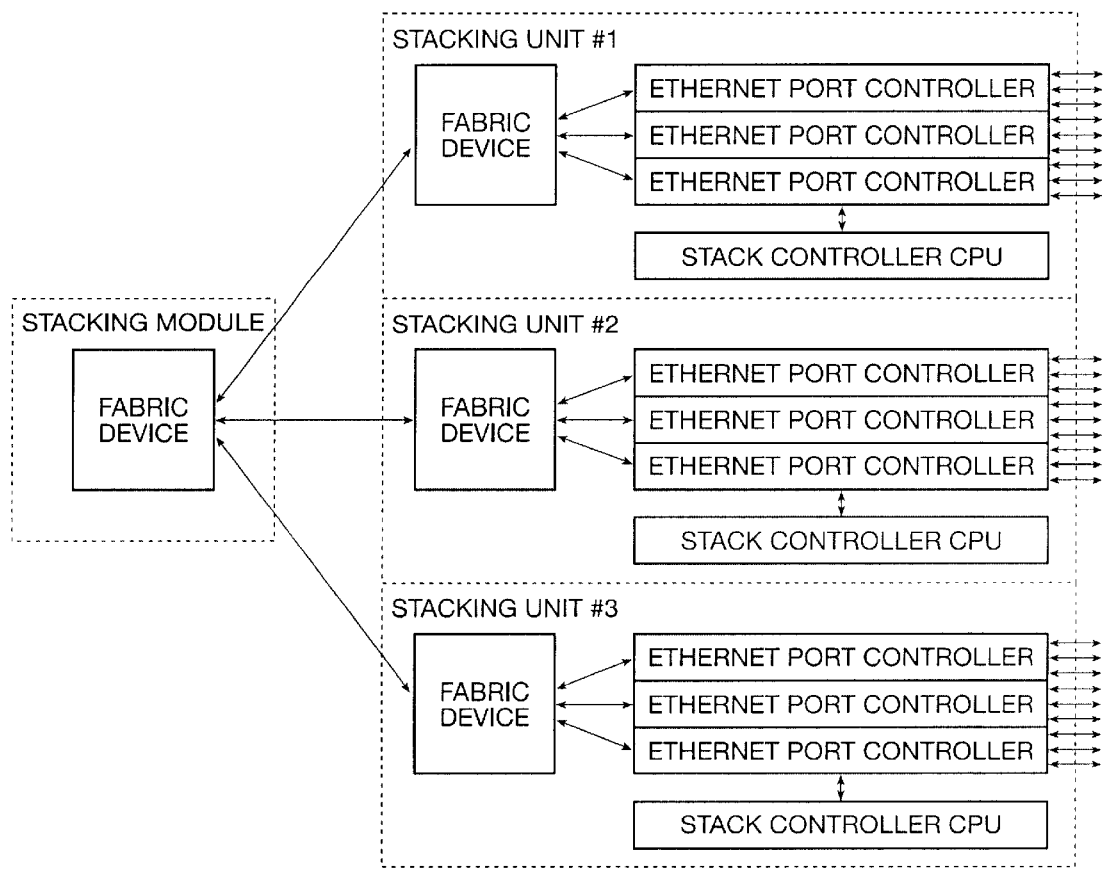
FIG. 1A is a block diagram illustration of a star stacking topology for interconnecting stacked Ethernet switches.
Figure 1B:
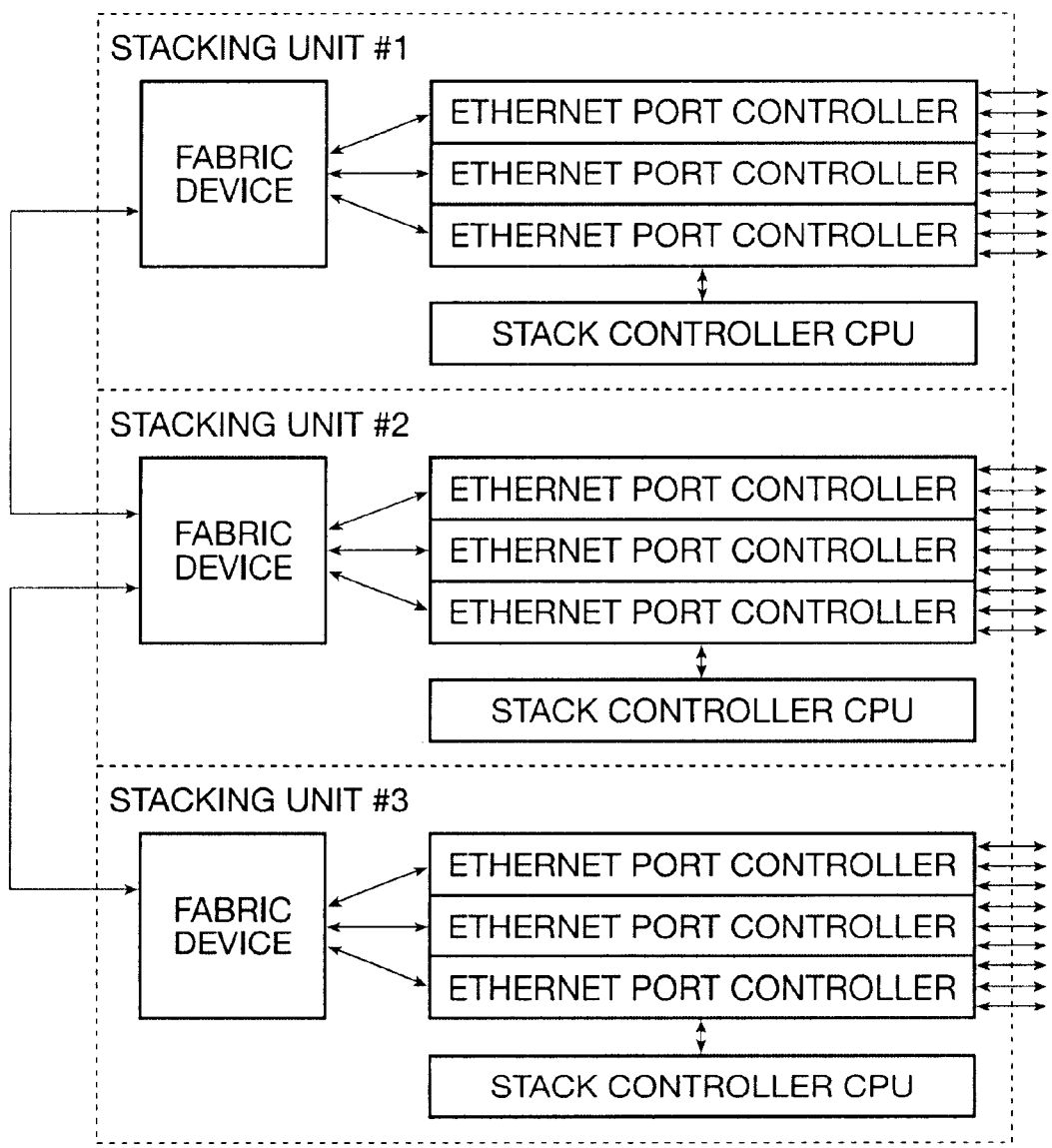
FIG. 1B is a block diagram illustration of a bus stacking topology for interconnecting stacked Ethernet switches.

FIGS. 1A and 1B depict two exemplary configurations of the EXACT™ system. FIG. 1A essentially depicts a "star" stacking topology, in which a hierarchy of fabric devices is used to interconnect the Ethernet port controllers in the three stacking units depicted. FIG. 1B depicts a "bus" stacking topology, which employs a cascaded interconnect approach to provide data transfer paths between the three stacking units depicted. The priority resolution mechanism described herein is capable of dealing with both of these topologies, as well as others such as meshes, rings, etc. Note that each of the stacking units depicted in FIGS. 1A and 1B has at least one stack controller CPU, attached to one of the stacking unit's port controllers. The stack controller CPUs implement the software portion of the mechanism. It is also possible for one or more (but not all) of the stacking units to contain no stack controller CPUs. Stacking units without CPUs do not participate in the priority resolution mechanism and always act as slave units.

The priority arbitration mechanism requires certain hardware characteristics to support communications between stack controller CPUs. These are:

1. A dedicated hardware register, containing at least 1 bit of data, that is associated with each stack controller CPU in the system. In the EXACT™ system, this register is contained within each port controller, and may be accessed by a stack controller CPU attached to the port controller. However, alternative embodiments are possible, provided that the register is used for no other purpose and is readily accessible to the stack controller CPU. There should be one register per stack controller CPU.

2. A means whereby a stack controller CPU can read and write data to its associated hardware register at any time. It is only necessary for each stack controller CPU to have free access to its own associated register; the registers associated with other stack controller CPUs may not be accessible except via the broadcast mechanism described below.

3. A general broadcast mechanism, whereby any stack controller CPU may write pre-determined data to all of the hardware registers associated with all of the stack controller CPUs in the system. This mechanism is typically implemented within the fabric devices, and (in the preferred embodiment of the invention) consists of a special data write request message that can be sent by any stack controller CPU to its nearest fabric device, causing the fabric device to replicate the request message to all of its ports, and so on, until the write request message has been transferred by the fabric devices to every stack controller CPU in the system. The broadcast mechanism is principally used by a stack controller CPU to write data to the hardware registers associated with all of the other stack controller CPUs in the system at the same time. Note that the messages used to implement this capability are handled in the same manner, using the same interconnect paths, as those carrying packet data required for switch operation.

4. A broadcast message hold-down timer built into each fabric device to prevent "broadcast storms" from occurring in looped topologies as a result of the general broadcast mechanism described above. The hold-down timer is activated whenever a fabric device forwards a broadcast message to all of its ports; once activated, it prevents additional broadcast messages from being forwarded until a pre-specified time interval has elapsed. If additional broadcast messages are received within this interval, they are simply discarded. This eliminates the possibility of infinite broadcast message replication caused when loops are created in the fabric topology.

5. A globally unique binary number, of arbitrary length, that is permanently configured into each and every stack controller CPU. This binary number must be unique to the stack controller, and is used to implement the priority resolution process. The provision of such a binary number is standard practice for Ethernet switches, which normally have a unique 48-bit Ethernet address assigned to them permanently at the time the switch unit is manufactured. Other means of providing such a unique binary number are also possible.

The above hardware characteristics facilitate stack controller election using a completely topology-independent priority arbitration mechanism implemented in software executed by the various stack controller CPUs. As previously noted, all stack controller CPUs run identical copies of the software, which function in an identical manner. Therefore, a description of the operation of the software operating on one stack controller CPU will enable persons skilled in the art to comprehend the operation of the entire system.

The priority arbitration (election) process consists of three different phases:

1. A "synchronization" phase, in which all of the active stack controller CPUs in the system attempt to synchronize their election sequences with each other. This phase is required to ensure that the election process takes place in a coherent manner, regardless of disparate types of stacked units and variance in unit power-on intervals.

2. An arbitration or "ID broadcast" phase, in which each stack controller CPU broadcasts its unique binary number, or ID number, to all other controllers, and checks to see whether it possesses the lowest ID. The stack controller with the numerically lowest ID "wins" the election at the culmination of this phase.

3. A "notification" phase, used by the "winning" stack controller CPU to obtain status information from the previous election winner (if any) and also to broadcast information to all of the other controllers. This phase may be omitted if the only purpose of the election process is to select a particular controller as being the "master".

The election process is constantly repeated as long as one or more units are powered on. A stack controller CPU must "win" at least N consecutive elections, where N is some number greater than one, prior to taking control of the stack, and must continue to win all future elections to retain control. "Loss" of any election requires the stack controller CPU to immediately cease controlling the stack resources, to avoid conflict with the new "winner".

Figure 2:
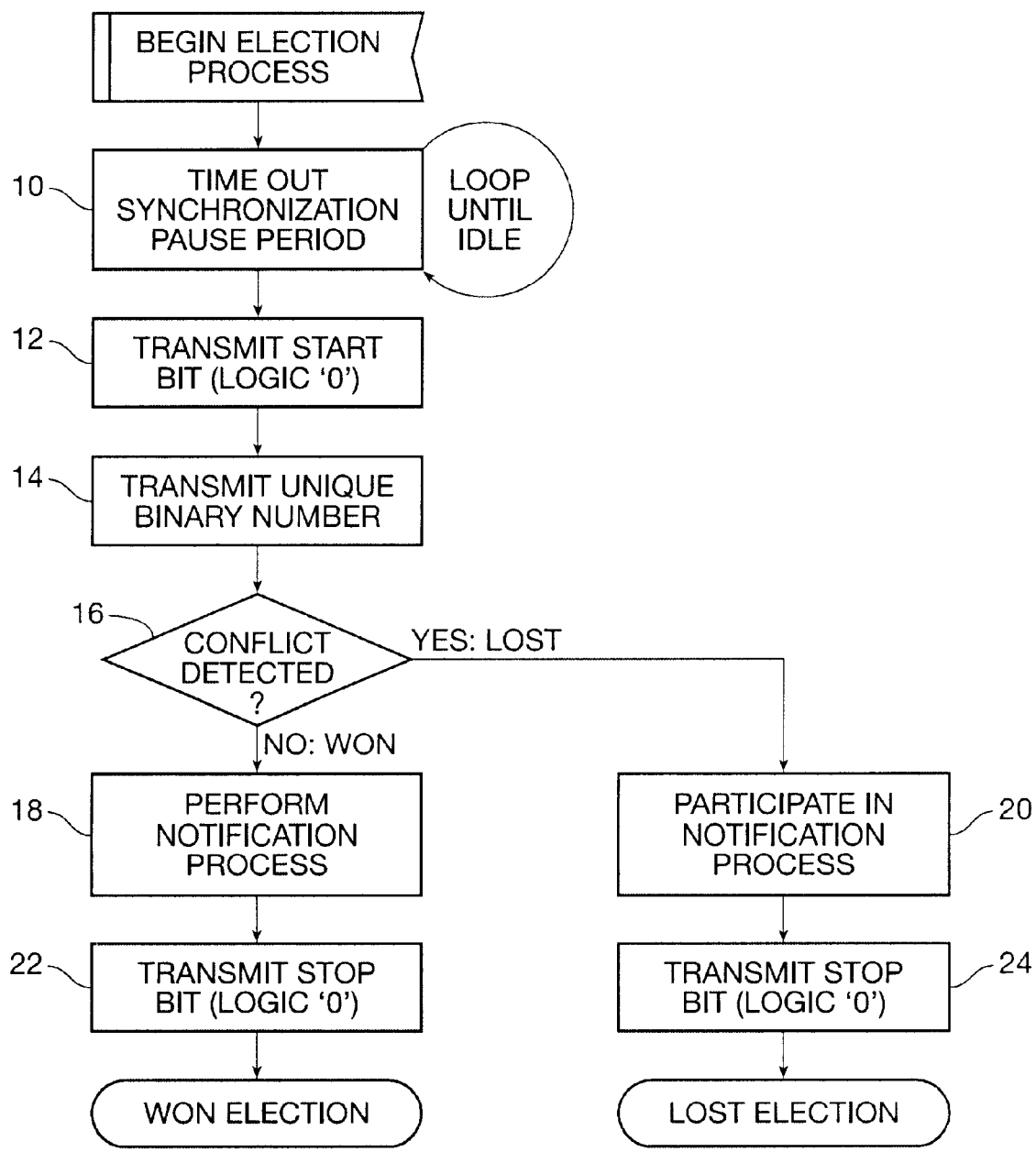
FIG. 2 is a flowchart illustrating the basic procedural steps in a priority arbitration process for implementing a stack controller CPU arbitration process in accordance with the invention.

During the synchronization phase (FIG. 2, block 10) a period of silence, of some fixed duration, is imposed during which no stack controller CPU may broadcast any messages that may affect the dedicated hardware registers of other stack controller CPUs. Each stack controller CPU monitors its local dedicated hardware register to detect data written into such registers by another stack controller CPU. Detection of such data implies that an election process is currently running. If such data is detected, then the non-participating stack controller CPUs must restart their synchronization phases. This continues until after the required silence period has been is observed, after which all of the stack controller CPUs first transmit a start bit for global synchronization purposes (FIG. 2, block 12) and then enter the ID number broadcast phase. The purpose of the synchronization phase is to ensure that all active stack controller CPUs enter the ID number broadcast phase at nearly the same instant.

After the synchronization phase has been completed, a serial bit transfer process (hereinafter described in greater detail) is used by each stack controller CPU to transmit its unique ID number (FIG. 2, block 14), starting from the most significant bit and working downwards, during the ID broadcast phase of the election process. If, at any point in this phase, a particular stack controller discovers (FIG. 2, block 16) that its individual ID number contains a '1' but some other controller has written a '0' to its dedicated hardware register (indicating that such other controller has a '0' in the corresponding bit position of the other controller's ID number), then that particular stack controller is considered to have "lost" the election. That particular stack controller continues to participate in the election sequence (by accepting data written to its dedicated hardware register by other controllers) but must refrain from writing any more data to the dedicated hardware registers of the other CPUs in the system. Note that if there is only one stack controller in a system, it will always "win" every election.

It can thus be seen that the "winner" of the election process is the stack controller CPU that has the lowest value assigned as its unique binary ID number. The "winning" stack controller is required to continue the process into the (optional) notification phase (FIG. 2, block 18), in which the same serial bit transfer process is used to notify the remaining controllers, if any, (FIG. 2, block 20) that the "winning" stack controller has "won" the election, indicate any desired status information, and possibly present an opportunity for the previous election winner to transfer additional status information. Finally, all of the controllers (both "winning" and "losing") transmit a stop bit (FIG. 2, block 22 or 24), indicating that the election process has completed. The controllers then repeat the entire election procedure in its entirety commencing with FIG. 2, block 10.

The priority arbitration mechanism will now be described in greater detail. The basic bit-transfer process used to convey information between stack controller CPUs (via the dedicated hardware registers) is discussed first, followed by the details of the three phases used in the arbitration sequence.

Bit Transfer Process

In general, information is exchanged between stack controller CPUs as a serial stream of bits that are broadcast to all of the dedicated hardware registers associated with the various CPUs. The interval between two consecutive bits is referred to as a "bit period". The transfer of each bit takes place in three distinct steps, bounded by the start and end of the corresponding bit period:

1. At the start of each bit period, every stack controller CPU is expected to set its own dedicated hardware register to a logic '1'. As all stack controller CPUs are expected to have free access to their own dedicated hardware registers, this is accomplished simply by directly writing to the register. Stack controller CPUs are not permitted to write to the dedicated hardware registers of other stack controller CPUs at the start of each bit period.

2. After a fixed, constant delay interval, each stack controller CPU determines the value ('0' or '1') of the relevant data bit to be transmitted to the other CPUs, and performs the following actions:

(a) All stack controller CPUs that must write a logic '0' do so, using the general broadcast mechanism to write a '0' to the dedicated hardware registers associated with every stack controller CPU in the system. This forces every dedicated hardware register in the system to a logic '0'. The broadcast hold-down timers prevent broadcast storms, regardless of the system topology (i.e. if the system contains loops).

(b) All stack controller CPUs that must write a logic '1' refrain from writing any data to the dedicated hardware registers, because the registers were already set to '1' in step (1) above.

(c) At the completion of step 2 (b), the dedicated hardware registers will thus have been set to the logical-AND of the bits to be written by the stack controllers. That is, if any controller writes a '0', then all of the registers will hold a '0'. The registers will hold a '1' only if all of the controllers determine that the value of the relevant data bit to be transmitted to the other CPUs is '1'.

3. At the end of the bit period (another constant delay internal following completion of step 2), each stack controller reads the contents of its assigned dedicated hardware register to obtain the result of the information exchange. The process is then repeated, starting with step 1, for the next bit of data to be exchanged.

It is readily seen from the above that each of the dedicated hardware registers need only be 1 bit wide, as only a single bit of data is sent during a particular bit period. Each bit period is considered to last for a precise time interval: the permissible error in the bit period interval, the time of data transmission, as well as in the sampling of the contents of the dedicated hardware registers, is bounded by the total number of bits sent and the length of each bit period. In addition, the data transmission and sampling points must not fall outside the boundaries of the associated bit period.

The bit periods may be timed using either autonomous hardware timers in the stack controller CPUs or software timing loops. The accuracy of the bit period timing will ultimately determine the size of the bit period and the number of bits that may be transmitted during each arbitration sequence.

Synchronization Phase

The synchronization phase is designed to ensure that all of the active stack controller CPUs in the system will enter the ID broadcast phase as nearly simultaneously as possible, and also to prevent any newly powered-up controller from interfering with an ongoing election (as could happen, for example, if a unit was plugged into an operating stack in the middle of a running election sequence). The synchronization phase utilizes a "listen-before-transmit" approach, wherein the stack controller CPUs are required to ensure that no election activity is occurring for a specified duration prior to beginning the election process. In addition, the synchronization phase gives the stack controller CPUs time to ensure that the system is in a state that permits the subsequent arbitration and notification phases to operate properly.

Figure 3:
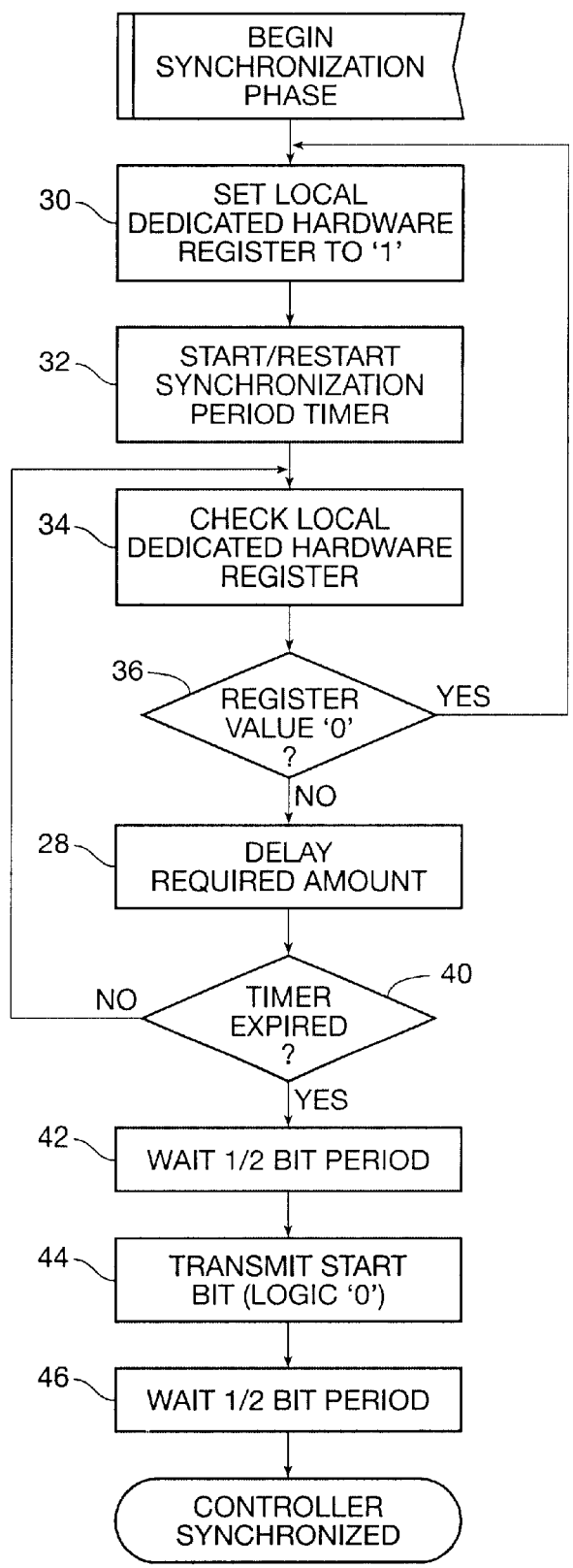
FIGS. 3, 4 and 5 are flowcharts which respectively illustrate the procedural steps of the synchronization, ID broadcast, and trailing synchronization sequence phases of a priority arbitration process for implementing a stack controller CPU arbitration process in accordance with the invention.

As shown in FIG. 3, the synchronization phase incorporates the following steps:

1. Each stack controller CPU sets its own dedicated hardware register to a logical '1' (FIG. 3, block 30).
2. Each stack controller CPU then starts (FIG. 3, block 32) a "synchronization period timer" for timing a large, fixed "synchronization period". The duration of the synchronization period is selected such that it is greater than the maximum interval between '0' bits in any election sequence; in the worst case, the duration should be set to the product of the number of bits of data being transferred and the bit period.
3. During the synchronization period, all of the stack controller CPUs constantly sample their local dedicated hardware registers (FIG. 3, block 34). If any stack controller CPU detects (FIG. 3, block 36) that its dedicated hardware register has gone to a logic '0' during the synchronization period (indicating that some other stack controller CPU has broadcast a '0' bit as part of an ongoing election process), then that CPU resets its dedicated hardware register back to a logical '1' and restarts its synchronization period timer (i.e. processing by that CPU branches to and resumes at FIG. 3, block 30). Each stack controller CPU repeats the foregoing process until at least one synchronization period has elapsed during which the CPU's local dedicated hardware register has not been set to a logical '0' (FIG. 3, blocks 38 & 40).
4. All of the stack controller CPUs then wait one-half bit period (FIG. 3, block 42) to bring the stack controller CPUs into the middle of the bit period, and then transmit a "start bit", which is a single logical '0' (FIG. 3, block 44). This signals all stack controller CPUs participating in a given election sequence that an election is about to begin. The start bit is transmitted according to the sequence laid out in the description of the bit transfer process above. Note that the duration of the bit period must be selected to ensure that small variations in the clock frequencies of the various controllers in the stack do not cause problems (e.g., by allowing a stack controller CPU with higher frequency clocks to lock-out one with a lower-frequency clock, by always transmitting its start bit prior to the end of the latter's synchronization period).
5. After the start bit has been transmitted, each controller CPU waits another one-half bit period, to reach the end of the bit period, before continuing (FIG. 3, block 46).

Each stack controller CPU that successfully transmits a start bit as described above is considered to be a participant in the election process, and must proceed to the ID broadcast phase described below. If any particular stack controller CPU fails to transmit a start bit as described above then that CPU must begin the entire synchronization phase anew.

The sampling interval (i.e., the delay between successive reads of the local dedicated hardware register) during the synchronization period is dependent on the state of the stack controller CPU. If the unit containing the stack controller CPU has been newly powered up or reset (i.e., this is its first election sequence since initialization), then it is required to continuously sample the register with as little delay as possible between reads. This is also true if the stack controller CPU detects that its dedicated hardware register has gone to zero during some subsequent synchronization period, indicating that it has lost synchronization with the rest of the stack controllers. If, however, the controller has successfully performed one or more election sequences, then it may increase the sampling interval to avoid unnecessary overhead incurred by the sampling process.

ID Broadcast Phase

In the ID broadcast phase a single stack controller CPU is selected from among the set of CPUs in the various units to manage and configure the stacked system. During this phase, each stack controller CPU that is participating in the election (as determined by the outcome of the above-described synchronization phase) transmits its unique binary number, using the broadcast bit transfer mechanism described previously, and autonomously determines whether it has won or lost the election.

The unique binary number assigned to each stack controller CPU may be of arbitrary size and content (subject to limitations imposed by the bit timing requirements) and may be derived by a variety of means which are well understood by persons skilled in the art and need not be described in detail here. One possibility is to concatenate a 4-bit configuration code with a 48-bit medium access control (MAC) address that is associated with each unit containing an active stack controller, with the configuration code being placed at the most-significant bit position of the resulting 52-bit number. The configuration code may then be used in a system-dependent way to create a hierarchy of stack controller CPUs, and force higher-priority members of the hierarchy to be elected in preference to lower-priority members. Such a mechanism may be used, for instance, to ensure that the most powerful stack controller CPU present across all of the units is always permitted to control and configure the system, regardless of the 48-bit MAC address; this is done by associating more-powerful CPUs with lower values of the 4-bit configuration code. If multiple stack controller CPUs possess the same configuration code, the 48-bit MAC addresses of these CPUs will then be used to break the resulting tie.

Figure 4:
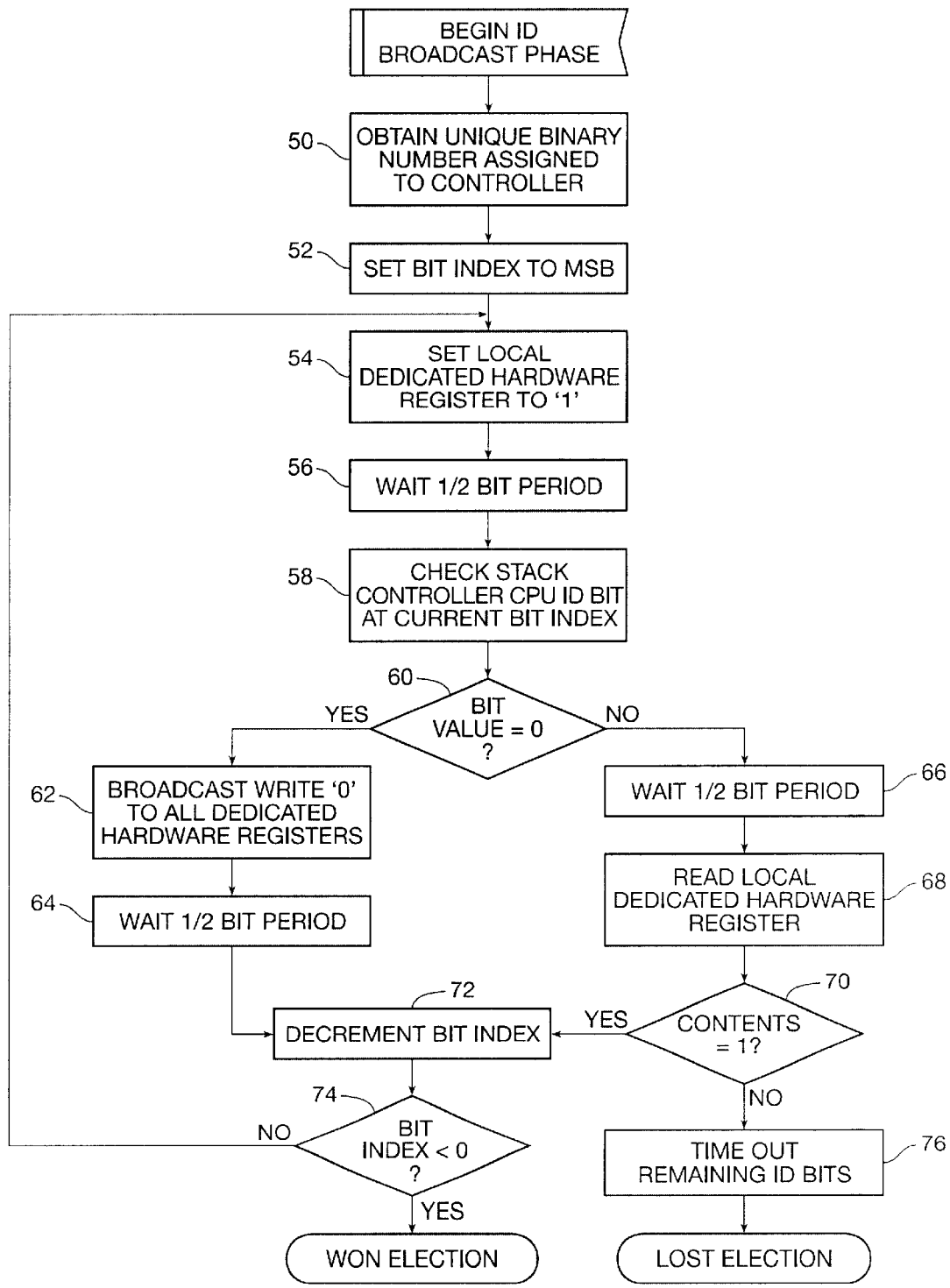

The ID broadcast sequence depicted in FIG. 4 is implemented by every active stack controller CPU that has successfully completed the synchronization phase, as follows:

1. The unique binary number representing the stack controller CPU ID number is formed as described above (FIG. 4, block 50). A bit index or counter is also initialized (FIG. 4, block 52) to point at the most significant bit (MSB) of the ID number (i.e., set equal to the number of bits in the ID).

2. The dedicated hardware register associated with the given stack controller CPU is set to a logical '1' (i.e. a predefined "dismissal value") at the start of the bit period (FIG. 4, block 54).
3. A time duration equal to one-half the bit period is timed out (FIG. 4, block 56), to bring the stack controller CPUs into the middle of the bit period.
4. If the value of the ID number bit pointed to by the current value of the bit index is '0' for any stack controller CPU, then that CPU broadcasts a logical '0' (i.e. a predefined "non-dismissal value") to the dedicated hardware registers of all of the stack controller CPUs in the system (FIG. 4, blocks 58, 60 & 62). Otherwise, the CPU does nothing (FIG. 4, blocks 58, 60 & "No" exit from block 60).
5. Another one-half bit-period is then timed out to reach the end of the bit period (FIG. 4, block 64 or 66).
6. If, in step 4, the stack controller CPU determines that the value of the ID number bit pointed to by the current value of the bit index is '1' (i.e. if processing branches from block 60 to block 66) then the CPU checks the contents of its local dedicated hardware register (FIG. 4, blocks 68 & 70). If the hardware register contains a logical '1' (i.e., no other stack controller CPU has attempted to set it to a '0'), then that stack controller CPU is permitted to stay in the arbitration process (i.e. processing branches along the "Yes" exit from block 70); otherwise, it is considered to have "lost" the arbitration (i.e. processing branches along the "No" exit from block 70). Note that stack controllers that wrote a logical '0' in step 4 are always permitted to stay in the arbitration process for the current bit, and so do not need to perform this check.
7. If the stack controller is allowed to remain in the arbitration process, it must now decrement its ID bit index by one (FIG. 4, block 72) to select the next lowest bit in the ID number, and repeat this process starting from step 2 above (i.e. processing branches from block 74's "No" exit back to block 54). If, on the other hand, the stack controller "lost" the arbitration and was forced to drop out in step 6, it must continue to count out bit periods (FIG. 4, block 76) and monitor its local dedicated hardware register, but is not permitted to perform any more broadcast writes for the duration of the ID broadcast sequence.
8. If no more bits remain within the unique ID number (i.e., the index into the number has become less than zero, such that processing branches along block 74's "Yes" exit), then the stack controller terminates the ID broadcast sequence. At this point, one and only one stack controller will have "won" the arbitration, provided that the IDs assigned to the stack controllers are truly unique.

As the ID numbers assigned to all of the stack controllers must be unique, one and only one stack controller CPU in the system will "win" the arbitration process. This will always be the CPU with the lowest numeric value as its unique ID number. Every stack controller CPU automatically knows whether it "won" or "lost" the arbitration after the last bit of the ID number has been broadcast and checked.

The "winning" controller is required to enter the notification phase prior to starting any system management or configuration operations. All other stack controllers are considered to have "lost" the arbitration process; they must also enter the notification phase, but are not allowed to interfere with the setup and management of the stacked system.

Notification Phase

The notification phase may optionally be used to interchange information between stack controllers (assuming that there is more than one in a system) and also serves to establish a timing marker prior to the start of the next synchronization phase. In general, the "winning" stack controller may use this phase to signal that it has become the stack master, and also to obtain information from the previous stack master (assuming that one existed, and control has just been handed off from one to the other as a consequence of the arbitration process). This latter purpose for the notification phase is optional; generation of the timing marker or "trailing synchronization sequence" is, however, required for proper operation of the priority arbitration mechanism.

The notification phase comprises an arbitrary number of bit periods, subject to the limitations imposed by the previously described bit timing restrictions, during which information is exchanged between master and slave stack controller CPUs in the system using the serial bit transfer process described above. The format of all but two of the bits transmitted (i.e., excepting those required for the trailing synchronization sequence) may follow whatever format is required for proper system operation. Examples of information that may be transmitted are: the system address (or other identifying number) for the master controller CPU, flag bits denoting a handover of stack mastership, and the system address of the previous stack master, if any.

The trailing synchronization sequence serves as a well-defined timing marker that is used by all stack controller CPUs to synchronize among themselves prior to the start of the next succeeding priority arbitration sequence. The trailing synchronization sequence consists of two bits of data, transmitted over two consecutive bit periods. The first bit is a logical '1', and serves to impose a recognizable period of inactivity before the second bit is transmitted. The second bit is set to a logical '0'; all the active stack controller CPUs in the system use the transition from the '1' bit to the trailing '0' to synchronize to each other prior to the next required synchronization phase.

The purpose of the trailing synchronization sequence is to bring all of the stack controller CPUs back into synchronization prior to the next priority arbitration sequence. Due to small differences in frequency between the clocks in different stack controller CPUs, it is possible for the bit period timers in the different CPUs to differ (i.e., get out of synchronization) by a substantial fraction of a bit period over each election interval. The trailing synchronization sequence essentially forces all of the stack controllers to re-align their bit periods with the stack controller CPU possessing the fastest clock; as a result, all of the active stack controller CPUs will enter the next election interval at the same time. The synchronization sequence can compensate a maximum cross-unit skew of one quarter of a bit period over each election interval.

Figure 5:
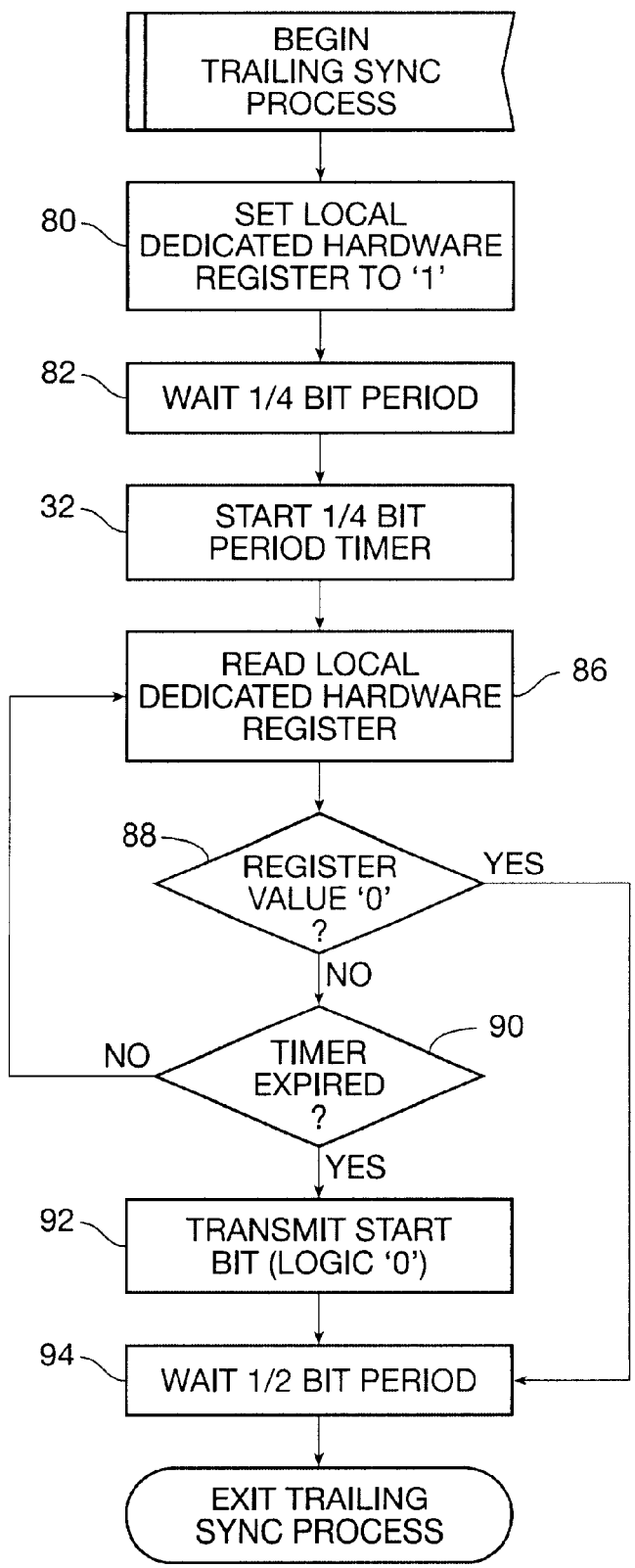

More particularly, as shown in FIG. 5, the trailing synchronization sequence commences by setting the dedicated hardware register associated with the given stack controller CPU to a logical '1' (FIG. 5, block 80). The stack controller CPU then waits one-quarter bit period (FIG. 5, block 82) to account for the maximum cross-unit skew, as aforesaid. A one-quarter bit period timer is then started (FIG. 5, block 84). As the timer counts down, the CPU continually monitors (FIG. 5, block 86) the contents of its dedicated hardware register to determine (FIG. 5, block 88) whether the contents value has been changed to a logical '0' (indicating that some other stack controller CPU having a faster clock has broadcast a '0' bit). If a logical '1' value remains in the CPU's dedicated hardware register when the timer expires (i.e. processing branches along the "No" exit from block 88 and thence along the "Yes" exit from block 90) then that CPU broadcasts a "start bit", which is a single logical '0' bit, to all of the other stack controller CPUs (FIG. 5, block 92). After the start bit has been transmitted, each controller CPU waits another one-half bit period, to reach the end of the bit period, before continuing (FIG. 5, block 94). If any CPU determines (FIG. 5, block 88) that the contents value of its dedicated hardware register has changed to a logical '0' then that CPU stops monitoring the contents of its dedicated hardware register and enters the one-half bit waiting period together with all other CPUs, thereby synchronizing the CPUs.

As will be apparent to those skilled in the art in the light of the foregoing disclosure, many alterations and modifications are possible in the practice of this invention without departing from the spirit or scope thereof. For example, the stack controller CPUs can be interfaced to the switching fabric by other means. Accordingly, the scope of the invention is to be construed in accordance with the substance defined by the following claims.

What is claimed is:

1. A method of allocating master priority to a unique one of a plurality of interconnected processors, said method comprising:

(a) providing one data storage register for each one of said processors;

(b) interconnecting said registers and said processors with a logical message passing network having an arbitrary topology to enable any one of said processors to store data in all of said registers, and to enable each one of said processors to read data stored in said one register provided for said each one of said processors;

(c) allocating a unique multiple bit identifier to each one of said processors;

(d) synchronizing said processors with one another by broadcasting a logical data write message across said network to said processors; and, (e) arbitratively selecting and allocating said master priority to that one of said processors for which said allocated identifier has a value lower than the value of any other one of said identifiers allocated to any other one of said processors.

2. A method as defined in claim 1, wherein said arbitratively selecting further comprises repetitively:

(a) for each one of said processors which has not previously been dismissed as a candidate for said master priority allocation, selecting a next portion of said identifier allocated to said one of said processors which has not previously been dismissed; and, (b) dismissing as a candidate for said master priority allocation all of said processors which have not previously been dismissed and for which said selected portion of said identifier has a value corresponding to said dismissal value;

until all but one of said processors has been dismissed as a candidate for said master priority allocation.

3. A method as defined in claim 1, wherein said arbitratively selecting further comprises, for each one of said processors which has not previously been dismissed as a candidate for said master priority allocation, repetitively:

(a) storing a predefined dismissal value in said register provided for said one of said processors which has not previously been dismissed;

(b) selecting a next portion of said identifier allocated to said one of said processors which has not previously been dismissed;

(c) if said selected portion of said identifier has a value corresponding to a predefined non-dismissal value, actuating said one of said processors which has not previously been dismissed to store said non-dismissal value in all of said registers; and, (d) if said selected portion of said identifier has a value corresponding to said dismissal value and if said non-dismissal value is stored in said register provided for said one of said processors which has not previously been dismissed, dismissing as a candidate for said master priority allocation said one of said processors which has not previously been dismissed;

until all but one of said processors are dismissed as a candidate for said master priority allocation.

4. A method as defined in claim 1, wherein said arbitratively selecting further comprises:

(a) initializing a bit index to a value corresponding to a most significant bit position of said identifier;

(b) for each one of said processors which has not previously been dismissed as a candidate for said master priority allocation, repetitively:

(i) storing a logical "1" value in said register provided for said one of said processors which has not previously been dismissed;

(ii) selecting a one bit portion of said identifier allocated to said one of said processors which has not previously been dismissed from that bit position of said identifier corresponding to said bit index value;

(iii) if said selected one bit portion of said identifier has a logical value of "0", actuating said one of said processors which has not previously been dismissed to store a logical value of "0" in all of said registers;

(iv) if said selected portion of said identifier has a logical value of "1" and if a logical value of "0" is stored in said register provided for said one of said processors which has not previously been dismissed, dismissing as a candidate for said master priority allocation said one of said processors which has not previously been dismissed; and, (v) decrementing said bit index value by one;

until all but one of said processors are dismissed as a candidate for said master priority allocation.

5. A method as defined in claim 1, wherein said arbitratively selecting further comprises:

(a) initializing a bit index to a value corresponding to a most significant bit position of said identifier;

(b) for each one of said processors which has not previously been dismissed as a candidate for said master priority allocation, repetitively:

(i) storing a logical "1" value in said register provided for said one of said processors which has not previously been dismissed;

(ii) waiting for a predefined time interval;

(iii) selecting a one bit portion of said identifier allocated to said one of said processors which has not previously been dismissed from that bit position of said identifier corresponding to said bit index value;

(iv) if said selected one bit portion of said identifier has a logical value of "0", actuating said one of said processors which has not previously been dismissed to store a logical value of "0" in all of said registers and then waiting for said predefined time interval;

(v) if said selected portion of said identifier has a logical value of "1" then waiting for said predefined time interval, reading the contents of said register provided for said one of said processors which has not previously been dismissed, and if a logical value of "0" is stored in said register provided for said one of said processors which has not previously been dismissed, dismissing as a candidate for said master priority allocation said one of said processors which has not previously been dismissed; and, (vi) decrementing said bit index value by one; until all but one of said processors are dismissed as a candidate for said master priority allocation and thereby simultaneously producing at each one of said processors an indication of whether said master priority has or has not been allocated to said one of said processors.

6. A method as defined in claim 5, wherein said predefined time interval is one-half of the time interval required for any one of said processors to transmit a one bit data value to any one of said registers.

7. A method as defined in any one of claims 1, 2, 3, 4, 5, or 6, wherein said synchronizing of said processors further comprises, for each one of said processors:

(a) storing a logical "1" value in said register provided for said one of said processors;

(b) during a predefined synchronization time interval:
   (i) reading the contents of said register provided for said one of said processors;
   (ii) if a logical value of "0" is stored in said register provided for said one of said processors then restarting said synchronizing, commencing with said storing;
   (iii) if a logical value of "1" is stored in said register provided for said one of said processors then continuing said synchronizing, commencing with said reading;

(c) waiting for a predefined half-bit time interval;

(d) actuating said one of said processors to transmit a start bit; and, (e) waiting for said half-bit time interval.

8. A method as defined in claim 7, wherein said half-bit time interval is one-half of the time interval required for any one of said processors to transmit a one bit data value to any one of said registers.

9. A method as defined in any one of claims 1, 2, 3, 4, 5, or 6, further comprising resynchronizing said processors after allocation of said master priority by, for each one of said processors:

(a) storing a logical "1" value in said register provided for said one of said processors;

(b) waiting for a first predefined quarter-bit time interval;

(c) during a second quarter-bit time interval subsequent to said first quarter-bit time interval:
   (i) reading the contents of said register provided for said one of said processors;
   (ii) if a logical value of "0" is stored in said register provided for said one of said processors then waiting for a predefined half-bit time interval and then terminating said resynchronizing;
   (iii) if a logical value of "1" is stored in said register provided for said one of said processors then continuing said resynchronizing, commencing with said reading;

(d) actuating said one of said processors to transmit a stop bit; and, (e) waiting for a predefined half-bit time interval.

10. A method as defined in claim 9, wherein:

(a) said quarter-bit time interval is one-quarter of the time interval required for any one of said processors to transmit a one bit data value to any one of said registers; and, (b) said half-bit time interval is one-half of the time interval required for any one of said processors to transmit a one bit data value to any one of said registers.

11. A method as defined in any one of claims 1, 2, 3, 4, 5, or 6, wherein said synchronizing of said processors further comprises, for each one of said processors:

(a) storing a logical "1" value in said register provided for said one of said processors;

(b) during a predefined synchronization time interval:
   (i) reading the contents of said register provided for said one of said processors;
   (ii) if a logical value of "0" is stored in said register provided for said one of said processors then restarting said synchronizing, commencing with said storing;
   (iii) if a logical value of "1" is stored in said register provided for said one of said processors then continuing said synchronizing, commencing with said reading;

(c) waiting for a predefined half-bit time interval;

(d) actuating said one of said processors to transmit a start bit;

(e) waiting for said half-bit time interval; said method further comprising resynchronizing said processors after allocation of said master priority by, for each one of said processors:

(f) storing a logical "1" value in said register provided for said one of said processors;

(g) waiting for a first predefined quarter-bit time interval;

(h) during a second quarter-bit time interval subsequent to said first quarter-bit time interval:
   (i) reading the contents of said register provided for said one of said processors;
   (ii) if a logical value of "0" is stored in said register provided for said one of said processors then waiting for a predefined half-bit time interval and then terminating said resynchronizing;
   (iii) if a logical value of "1" is stored in said register provided for said one of said processors then continuing said resynchronizing, commencing with said reading;

(i) actuating said one of said processors to transmit a stop bit; and, (j) waiting for said half-bit time interval.

12. A method as defined in claim 11, wherein:

(a) said quarter-bit time interval is one-quarter of the time interval required for any one of said processors to transmit a one bit data value to any one of said registers; and, (b) said half-bit time interval is one-half of the time interval required for any one of said processors to transmit a one bit data value to any one of said registers.

13. A method as defined in any one of claims 3, 4, 5, or 6, further comprising, for each one of said processors:

(a) initiating timing of a predefined broadcast hold-down time interval whenever said one of said processors is actuated to store data in all of said registers; and, (b) during said timing of said broadcast hold-down time interval, preventing further actuation of said one of said processors to store data in all of said registers.

14. A method as defined in any one of claims 1, 2, 3, 4, 5, or 6, further comprising, after allocation of said master priority to said unique one of said processors, actuating said unique one of said processors to:
   (a) notify all of said processors of said allocation of said master priority to said unique one of said processors; and,
   (b) transmit control and address data between said unique one of said processors and all of said processors excepting said unique one of said processors.

15. A method as defined in claim 14, wherein said actuating of said unique one of said processors further comprises serial bit transfer of data from said unique one of said processors to all of said registers, said method further comprising actuating all of said processors excepting said unique one of said processors to serially read said data from said respective registers.

16. Apparatus for allocating master priority to a unique one of a plurality of interconnected processors, said apparatus comprising:
   (a) a data storage register for each one of said processors;
   (b) arbitrary topology logical message passing network means for interconnecting said registers and said processors to enable any one of said processors to store data in all of said registers, and to enable each one of said processors to read data stored in said one register provided for said each one of said processors;
   (c) a unique multiple bit identifier allocated to each one of said processors;
   (d) data write logical message broadcast means for synchronizing said processors with one another; and,
   (e) means for arbitratively selecting and allocating said master priority to that one of said processors for which said allocated identifier has a value lower than the value of any other one of said identifiers allocated to any other one of said processors.

17. Apparatus as defined in claim 16, wherein said means for arbitratively selecting further comprises, for each one of said processors, means for selecting a next portion of said identifier allocated to said one of said processors, and means for dismissing as a candidate for said master priority allocation all of said processors which have not previously been dismissed and for which said selected portion of said identifier has a value corresponding to said dismissal value, until all but one of said processors has been dismissed as a candidate for said master priority allocation.

18. Apparatus as defined in claim 16, wherein said means for arbitratively selecting further comprises, for each one of said processors:
   (a) means for storing a predefined dismissal value in said register provided for said one of said processors;
   (b) means for selecting a next portion of said identifier allocated to said one of said processors;
   (c) means for actuating said one of said processors to store said non-dismissal value in all of said registers if said selected portion of said identifier has a value corresponding to a predefined non-dismissal value; and,
   (d) means for dismissing said one of said processors as a candidate for said master priority allocation if said selected portion of said identifier has a value corresponding to said dismissal value and if said non-dismissal value is stored in said register provided for said one of said processors.

19. Apparatus as defined in claim 16, wherein said means for arbitratively selecting further comprises:
   (a) means for initializing a bit index to a value corresponding to a most significant bit position of said identifier;
   (b) for each one of said processors which has not previously been dismissed as a candidate for said master priority allocation:
      (i) means for storing a logical "1" value in said register provided for said one of said processors which has not previously been dismissed;
      (ii) means for selecting a one bit portion of said identifier allocated to said one of said processors which has not previously been dismissed from that bit position of said identifier corresponding to said bit index value;
      (iii) means for actuating said one of said processors which has not previously been dismissed to store a logical value of "0" in all of said registers if said selected one bit portion of said identifier has a logical value of "0";
      (iv) means for dismissing as a candidate for said master priority allocation said one of said processors which has not previously been dismissed if said selected portion of said identifier has a logical value of "1" and if a logical value of "0" is stored in said register provided for said one of said processors which has not previously been dismissed; and,
      (v) means for decrementing said bit index value by one until all but one of said processors are dismissed as a candidate for said master priority allocation.

20. Apparatus as defined in claim 16, wherein said means for arbitratively selecting further comprises:
   (a) means for initializing a bit index to a value corresponding to a most significant bit position of said identifier;
   (b) for each one of said processors which has not previously been dismissed as a candidate for said master priority allocation:
      (i) means for storing a logical "1" value in said register provided for said one of said processors which has not previously been dismissed;
      (ii) means for waiting for a predefined time interval;
      (iii) means for selecting a one bit portion of said identifier allocated to said one of said processors which has not previously been dismissed from that bit position of said identifier corresponding to said bit index value;
      (iv) means for actuating said one of said processors which has not previously been dismissed to store a logical value of "0" in all of said registers and then waiting for said predefined time interval if said selected one bit portion of said identifier has a logical value of "0";
      (v) means for dismissing as a candidate for said master priority allocation said one of said processors which has not previously been dismissed if said selected portion of said identifier has a logical value of "1" and if a logical value of "0" is stored in said register provided for said one of said processors which has not previously been dismissed; and,
      (vi) means for decrementing said bit index value by one until all but one of said processors are dismissed as a candidate for said master priority allocation.

21. Apparatus as defined in claim 20, wherein said predefined time interval is one-half of the time interval required for any one of said processors to transmit a one bit data value to any one of said registers.

22. Apparatus as defined in any one of claims 16, 17, 18, 19, 20, or 21, wherein said means synchronizing said processors further comprises, for each one of said processors:

(a) means for storing a logical "1" value in said register provided for said one of said processors;

(b) means for, during a predefined synchronization time interval:

(i) reading the contents of said register provided for said one of said processors;

(ii) if a logical value of "0" is stored in said register provided for said one of said processors restarting said synchronizing, commencing with said storing;

(iii) if a logical value of "1" is stored in said register provided for said one of said processors then continuing said synchronizing, commencing with said reading;

(c) means for waiting for a predefined half-bit time interval;

(d) means for actuating said one of said processors to transmit a start bit; and, (e) means for waiting for said half-bit time interval.

23. Apparatus as defined in claim 22, wherein said half-bit time interval is one-half of the time interval required for any one of said processors to transmit a one bit data value to any one of said registers.

24. Apparatus as defined in any one of claims 16, 17, 18, 19, 20, or 21, further comprising means for resynchronizing said processors after allocation of said master priority, said means for resynchronizing further comprising:

(a) means for storing a logical "1" value in said register provided for said one of said processors;

(b) means for waiting for a first predefined quarter-bit time interval;

(c) means for, during a second quarter-bit time interval subsequent to said first quarter-bit time interval:

(i) reading the contents of said register provided for said one of said processors;

(ii) if a logical value of "0" is stored in said register provided for said one of said processors then waiting for a predefined half-bit time interval and then terminating said resynchronizing;

(iii) if a logical value of "1" is stored in said register provided for said one of said processors then continuing said resynchronizing, commencing with said reading;

(d) means for actuating said one of said processors to transmit a stop bit; and, (e) means for waiting for a predefined half-bit time interval.

25. Apparatus as defined in claim 24, wherein:

(a) said quarter-bit time interval is one-quarter of the time interval required for any one of said processors to transmit a one bit data value to any one of said registers; and, (b) said half-bit time interval is one-half of the time interval required for any one of said processors to transmit a one bit data value to any one of said registers.

26. Apparatus as defined in any one of claims 16, 17, 18, 19, 20, or 21, further comprising, for each one of said processors:

(a) a broadcast hold-down timer for timing a predefined broadcast hold-down time interval;

(b) means for initiating said broadcast hold-down timer whenever said one of said processors is actuated to store data in all of said registers; and, (c) means for preventing further actuation of said one of said processors to store data in all of said registers while said broadcast hold-down timer is timing said broadcast hold-down interval.

27. Apparatus as defined in any one of claims 16, 17, 18, 19, 20, or 21, further comprising, means for, after allocation of said master priority to said unique one of said processors, actuating said unique one of said processors to:

(a) notify all of said processors of said allocation of said master priority to said unique one of said processors; and, (b) transmit control and address data between said unique one of said processors and all of said processors excepting said unique one of said processors.

* * * * *